US010616136B2

United States Patent
Hassan et al.

(10) Patent No.: US 10,616,136 B2
(45) Date of Patent: Apr. 7, 2020

(54) UTILIZATION BASED DYNAMIC RESOURCE ALLOCATION

(71) Applicant: Microsoft Technology Licensing, LLC, Redmond, WA (US)

(72) Inventors: Amer A. Hassan, Kirkland, WA (US); Russell A. Penar, Highlands Ranch, CO (US); Michael T. Gilbert, Thornton, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 166 days.

(21) Appl. No.: 15/957,479

(22) Filed: Apr. 19, 2018

(65) Prior Publication Data
US 2019/0327185 A1    Oct. 24, 2019

(51) Int. Cl.
| | | |
|---|---|---|
| *H04L 12/24* | (2006.01) | |
| *H04L 29/08* | (2006.01) | |
| *H04L 12/911* | (2013.01) | |
| *G06F 9/50* | (2006.01) | |
| *H04L 12/26* | (2006.01) | |
| *G06F 15/173* | (2006.01) | |

(52) U.S. Cl.
CPC .......... *H04L 47/822* (2013.01); *G06F 9/5027* (2013.01); *H04L 43/0876* (2013.01); *H04L 47/783* (2013.01)

(58) Field of Classification Search
USPC ........ 709/226, 203, 204, 224, 223, 229, 206
See application file for complete search history.

(56) References Cited

U.S. PATENT DOCUMENTS

| | | |
|---|---|---|
| 7,016,485 B2 | 3/2006 | Shtivelman |
| 7,788,354 B2 | 8/2010 | Nag |
| 7,978,827 B1 | 7/2011 | Becker et al. |
| 8,433,050 B1 | 4/2013 | Baten et al. |
| 8,588,376 B2 | 11/2013 | Kennedy et al. |

(Continued)

FOREIGN PATENT DOCUMENTS

| | | |
|---|---|---|
| CN | 105100957 A | 11/2015 |
| EP | 2357757 A1 | 8/2011 |

OTHER PUBLICATIONS

"Choosing a Routing Policy", Retrieved From <<https://docs.aws.amazon.com/Route53/latest/DeveloperGuide/routing-policy.html>>, Retrieved on Feb. 12, 2018, 8 Pages.

(Continued)

*Primary Examiner* — Jude Jean Gilles
(74) *Attorney, Agent, or Firm* — Schwegman Lundberg & Woessner, P.A.

(57) ABSTRACT

Methods and systems disclosed provide for dynamically allocating resources based on a utilization of a computing resource, such as a network or a stable storage device. In one aspect, a system including processing circuitry configured to perform operations, the operations including determining, at a first time, a utilization spike of a computing resource based on a utilization threshold, automatically adjusting the utilization threshold based on the determination, determining, during a time window, one or more second utilization spikes of the computing resource based on the adjusted utilization threshold; and dynamically reallocating resources in response to the determined one or more second utilization spikes meeting a first criterion.

20 Claims, 6 Drawing Sheets

(56) References Cited

U.S. PATENT DOCUMENTS

| | | | |
|---|---|---|---|
| 8,699,700 | B2 | 4/2014 | Williams et al. |
| 8,811,597 | B1 | 8/2014 | Hackbarth et al. |
| 8,856,797 | B1 | 10/2014 | Siddiqui et al. |
| 8,942,710 | B2 | 1/2015 | Brisebois |
| 9,253,330 | B2 | 2/2016 | Boss et al. |
| 9,378,475 | B2 | 6/2016 | Gnanasambandam et al. |
| 9,413,882 | B2 | 8/2016 | Gisby et al. |
| 9,680,855 | B2 | 6/2017 | Schultz et al. |
| 10,193,822 | B1* | 1/2019 | Bacus .................... H04L 47/788 |
| 2003/0046396 | A1* | 3/2003 | Richter .................. G06F 9/505 709/226 |
| 2003/0233391 | A1* | 12/2003 | Crawford, Jr. .......... G06F 9/505 718/104 |
| 2008/0163207 | A1* | 7/2008 | Reumann ............... G06F 9/5077 718/1 |
| 2008/0233992 | A1* | 9/2008 | Oteri .................... H04W 52/241 455/522 |
| 2009/0125385 | A1 | 5/2009 | Landvater |
| 2010/0325454 | A1* | 12/2010 | Parthasarathy ....... G06F 1/3203 713/320 |
| 2011/0276975 | A1 | 11/2011 | Brown et al. |
| 2014/0095691 | A1* | 4/2014 | Ganguli ............. H04L 41/5025 709/224 |
| 2014/0295786 | A1 | 10/2014 | Maier et al. |
| 2015/0287057 | A1 | 10/2015 | Baughman et al. |
| 2017/0031622 | A1* | 2/2017 | Nagarajan ............. G06F 3/0631 |
| 2017/0235622 | A1* | 8/2017 | Boyapalle ........... G06F 11/3055 714/47.2 |
| 2017/0244614 | A1* | 8/2017 | Wu .................... H04L 41/0631 |
| 2017/0264977 | A1 | 9/2017 | Silver et al. |

OTHER PUBLICATIONS

"Understanding Self-Tuning Threshold Monitors", Retrieved From <<https://technet.microsoft.com/en-us/library/dd789011.aspx>>, May 22, 2009, 4 Pages.

Peng, et al., "Towards Comprehensive Traffic Forecasting in Cloud Computing: Design and Application", In Journal of IEEE/ACM Transactions on Networking, vol. 24, No. 4, Aug. 2016, 13 Pages.

Issac, Luke P., "How Does Software and Hardware Load Balancer Work? (Loadbalancer Algorithms Explained with Examples", Retrieved From <<https://www.thegeekstuff.com/2016/01/load-balancer-intro/>>, Jan. 11, 2016, 12 Pages.

Mehra, et al., "Automated Learning of Load-Balancing Strategies in Multiprogrammed Distributed Systems", In International Journal of System Sciences, vol. 28, No. 11, Jul. 1, 1997, 33 Pages.

Monteiro, Miguel Aires Barros, "Forecasting Traffic and Balancing Load for Quality Driven LTE Networks", In Master Thesis of Higher Education Institute, Nov. 2016, 10 Pages.

"International Search Report and Written Opinion Issued in PCT Application No. PCTUS2019025921", dated Jul. 1, 2019, 14 Pages.

Shams, et al., "On Integrating Social and Sensor Networks for Emergency Management", In Proceedings of International Conference on Software Engineering and Formal Methods, Sep. 7, 2015, 15 Pages.

Bellini, Marc, "The New Customer Care Experience", In Technical Paper Prepared for SCTE/ISBE, NCTA Fall Technical Forum, Oct. 17, 2017, 16 Pages.

* cited by examiner

UTILIZATION BASED DYNAMIC RESOURCE ALLOCATION

BACKGROUND

Balancing load across multiple computing resources can be an effective method of providing increased capacity, fault tolerance, and higher operating margins. Some computing tasks may be less time sensitive, and may therefore be accomplished using slower or less performant resources, which may also have the advantage of being more cost effective than higher performing resources.

Furthermore, some computing environments, such as cloud computing environments, provide for dynamic allocation of additional resources as existing resources become fully utilized. Dynamic allocation of additional resources may also incur additional expense, so these measures should not be taken unless truly needed to accomplish computing tasks effectively.

Measuring which resources are effectively utilized and which have excess capacity may be challenging in some environments. For example, spikes in utilization of a first computing resource may cause some implementations to inappropriately select other computing resources for particular computing tasks, such as reading and/or writing to a stable (e.g. non-transient) storage device, processing a network communication, or computing a result of a calculation, when those tasks may be more effectively performed by the first computing resource, despite its current utilization. Inappropriate resource selection can be costly in terms of reduced performance, increased cost, and decreased customer satisfaction. Therefore, improved methods of dynamically allocating loads or tasks to computing resources are needed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
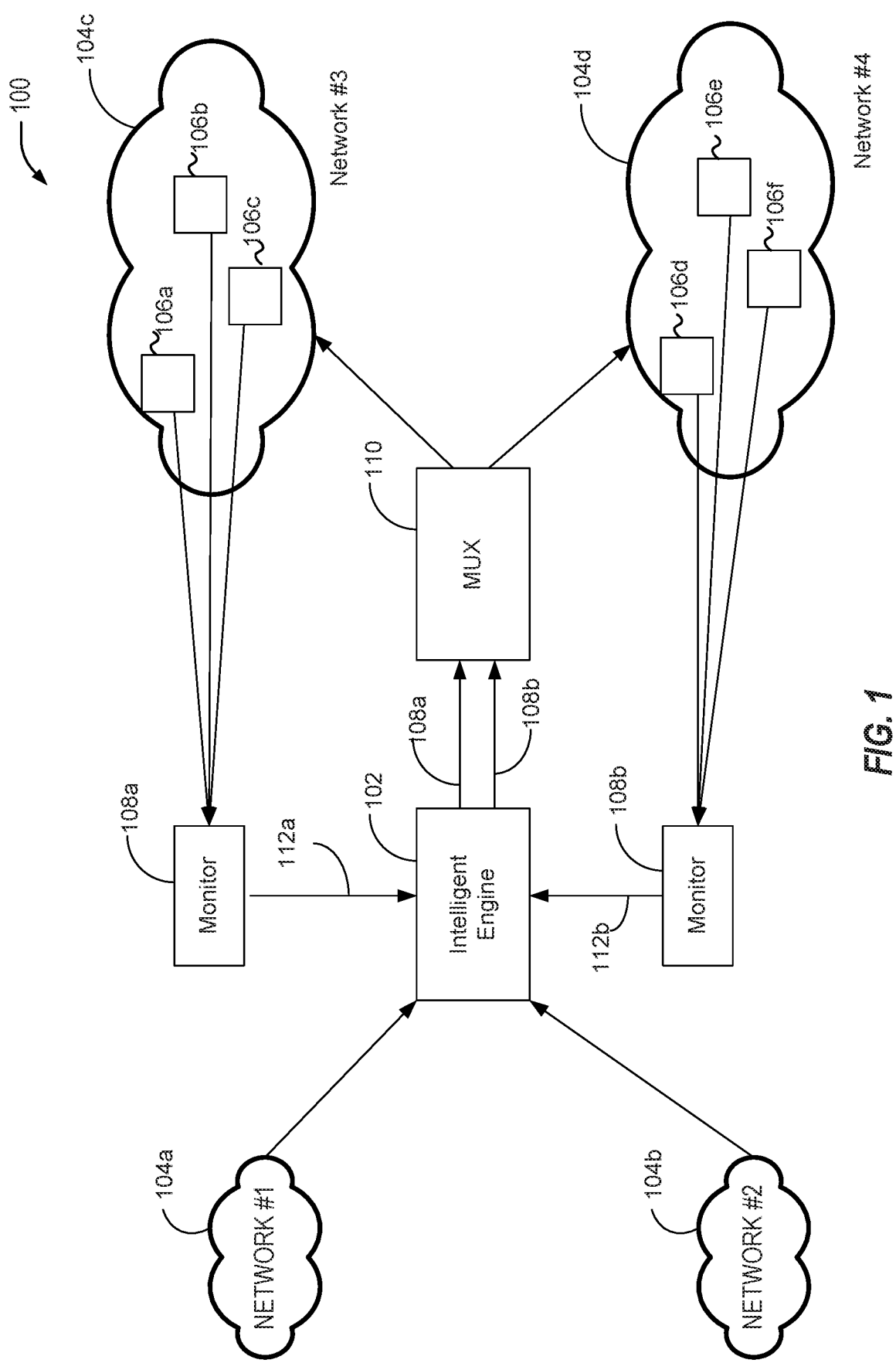
FIG. 1 is an overview diagram of a system implementing at least some of the disclosed embodiments.

The following description and the drawings illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, measuring utilization of computing resources may be a component of determining how to assign particular computing tasks to resources within a pool of resources. These computing tasks may include assigning file read and/or write requests to a stable storage device within a pool of stable storage devices, routing network communication over a first network or a second network, or assigning computation of a result, such as a result of a mathematical formula, to one of a pool of computational resources.

As one example, each stable storage device in a pool of stable storage devices may be experiencing a different utilization. For example, a seek time of a read/write head may limit a read/write throughput of a stable storage device. As the number of read/write tasks assigned to the stable storage device increases, a current throughput of the device approaches the throughput limit. In some aspects, the current throughput divided by the throughput limit may represent a percentage utilization of the stable storage device. A first storage device may have a faster or otherwise improved read and/or write capability when compared to a second stable storage device. Thus, when operating under similar loads, the utilization of the first stable storage device may be lower than the utilization of the second stable storage device.

Thus, these varied computing environments present a technical problem of how best to analyze utilization information for a subject computing resource. Another technical problem addressed by the disclosed embodiments is how to determine that the subject computing resource is operating at a relatively high capacity and that it may be experiencing reduced effectiveness as a result of the relatively high operating capacity. The disclosed embodiments also provide support for subsequent decisions based on the analysis of this utilization information. Such decisions may include assigning at least some computing tasks to other computing resources instead of the subject computing resource, to at least partially reduce the utilization of the subject computing resource over the medium term. This reduction in utilization may restore the subject computing resource to more effective operation.

The disclosed embodiments further benefit from a learning that allocating computing loads to computing resources based on a single utilization measurement, as is often done in many systems, may cause a technical problem by causing decisions that result in lowering overall system performance. For example, if a particular resource is experiencing a transient spike in utilization when a measurement is performed, this spike in utilization may result in computing loads being shifted away from that resource, when the resource's overall utilization may not be accurately characterized by the transient spike.

The disclosed embodiments solve this technical problem by evaluating utilization measurements with respect to at least two threshold values, including a first threshold value, and in some aspects, an adjusted value which may also be referred to in some aspects as a second threshold value. In some aspects, when a utilization exceeds a first threshold value at a first time, utilization measurements within a time window including the first time are evaluated with respect to a second threshold value, which may represent a lower utilization than the first threshold value. A number and/or frequency of utilization measurements that exceed the second threshold value during the time window may be determined. If the number and/or frequency meet one or more criterion, a determination may be made that the resource is over utilized, and computing loads, such as network traffic, disk read and/or write requests, processing tasks, or other computing tasks depending on the various embodiments, may then be shifted to other, less utilized resources.

Example types of utilization contemplated by the disclosed embodiments include network utilizations, bus utilizations, central processing unit (CPU) utilizations, disc utilizations, cache utilizations, or other types of utilizations. These utilizations may be in various forms. For example, utilizations may be measured and/or expressed in some aspects as a percentage of maximum utilization or capacity. For example, a CPU utilization of fifty (50) percent indicates that the CPU has tasks (other than an idle task) for execution ~50 percent of the time. Alternatively, utilizations may be represented as an absolute utilization in some aspects. For example, a network may be determined to have a utilization of 50 mega bits per second. The disclosed embodiments may compare utilization measurements over time to determine one or more spikes in utilization. A spike in utilization may, in some aspects, represent a utilization measurement that is over a threshold value. For example, some embodiments may define a spike in CPU utilization as any utilization over 75%. Other embodiments may define a spike n CPU utilization as any particular utilization measurement having a previous utilization measurement and a subsequent utilization measurement lower than the particular utilization measurement.

The first and second thresholds discussed above may also vary by embodiment. For example, one embodiment may define a first threshold at 75% CPU utilization and a second threshold at 50% utilization. Another embodiment may define a first threshold at 50 m/b per second and a second threshold at 40 m/b per second.

FIG. 1 is an overview diagram of a system implementing at least some of the disclosed embodiments. The system 100 includes an intelligent engine 102 connected to four networks 104*a-c*. In some embodiments, the intelligent engine 102 may be connected to two or more networks. Each of at least the networks 104*c-d* include network elements. Network 104*c* is shown including network elements 106*a-c* while network 104*d* is shown including network elements 106*d-f*. The network elements 106*a-f* may comprise a variety of network equipment types, such as routers, firewalls, switches, or any network element that may impose at least some performance limitation on the network 104*c* or 104*d*.

While each of the networks 104*c-d* are shown including three network elements each, one of skill would understand that each of the networks 104*c-d* could include fewer or more network elements than shown in FIG. 1. Each of the networks 104*a-d* shown in FIG. 1 may be of one or more network types. For example, each of the networks 104*a-d* may be an Internet Protocol (IP) network, Time Division Multiplexing Network, wireless network, public switched telephone network (PSTN), token ring network, or any other type of network.

Each of the network elements 106*a-f* is configured to transmit utilization information to a monitoring process 108*a-b*. For example, network elements 106*a-c* are shown to be configured to transmit usage information to monitor 108*a*, while network elements 106*d-f* are shown configured to transmit usage information to monitor 108*b*. In some aspects, monitor 108*a* and monitor 108*b* may be the same monitoring process. Each of the monitors 108*a-b* may be configured to summarize the utilization information received from the network elements 106*a-c* and 106*d-f* respectively. For example, individual measurements from the network elements 106*a-c* and 106*d-f* may be averaged to summarize them. Alternatively, median measurements may be determined from individual measurements from one or more of the network elements 106*a-f*. The summarized information 112*a-b* may then be transmitted by the monitors 108*a-b* respectively to the intelligent engine 102.

The intelligent engine 102 may determine how to route traffic received from one or more of the networks 104*a-b* based on the summarized utilization information 112*a-b* received from the monitors 108*a-b*. For example, if the intelligent engine determines that network #3 104*c* is more heavily utilized than network #4 104*d*, then the intelligent engine may route calls received from one or more of the networks 104*a-b* over network #4 104*d* instead of network #3 104*c*. In some aspects, the determination may be based on the detection of one or more spikes in utilization on the monitored network. In some aspects, an adaptive threshold may be used to determine whether a network is too heavily utilized to support additional traffic. For example, in some aspects, a first utilization may be detected that exceeds a first utilization threshold. In these aspects, the utilization surrounding this first detected utilization may then be examined, to determine whether the utilization of the network during a time period exceeds a second utilization threshold, or how many times the utilization exceeded the second utilization threshold. Based on this analysis, in some aspects, the intelligent engine 102 may determine whether the monitored network (e.g. 104*c* or 104*d*) is able to accept additional traffic or whether traffic should be routed to alternate networks.

Once the intelligent engine 102 has determined the utilization of one or more of the networks 104*c* and/or 104*d*, the intelligent engine may route network traffic, such as established call traffic or call request messages, over the third network 104*c* or the fourth network 104*d*. To accomplish said routing, in some aspects, the intelligent engine 102 may send a signal 108*a* to a multiplexer 110 to accomplish the routing decision. The signal 108*a* may indicate how to route data 108*b*. For example, the signal 108*a* may indicate whether the data 108*b* is to be routed over the third network 104*c* or the fourth network 104*d*. In some aspects, the signal 108*a* may be a gateway address for the selected network. In some other aspects, the routing may be accomplished by mapping a hostname for a destination to a default gateway identifying the selected network.

Figure 2:
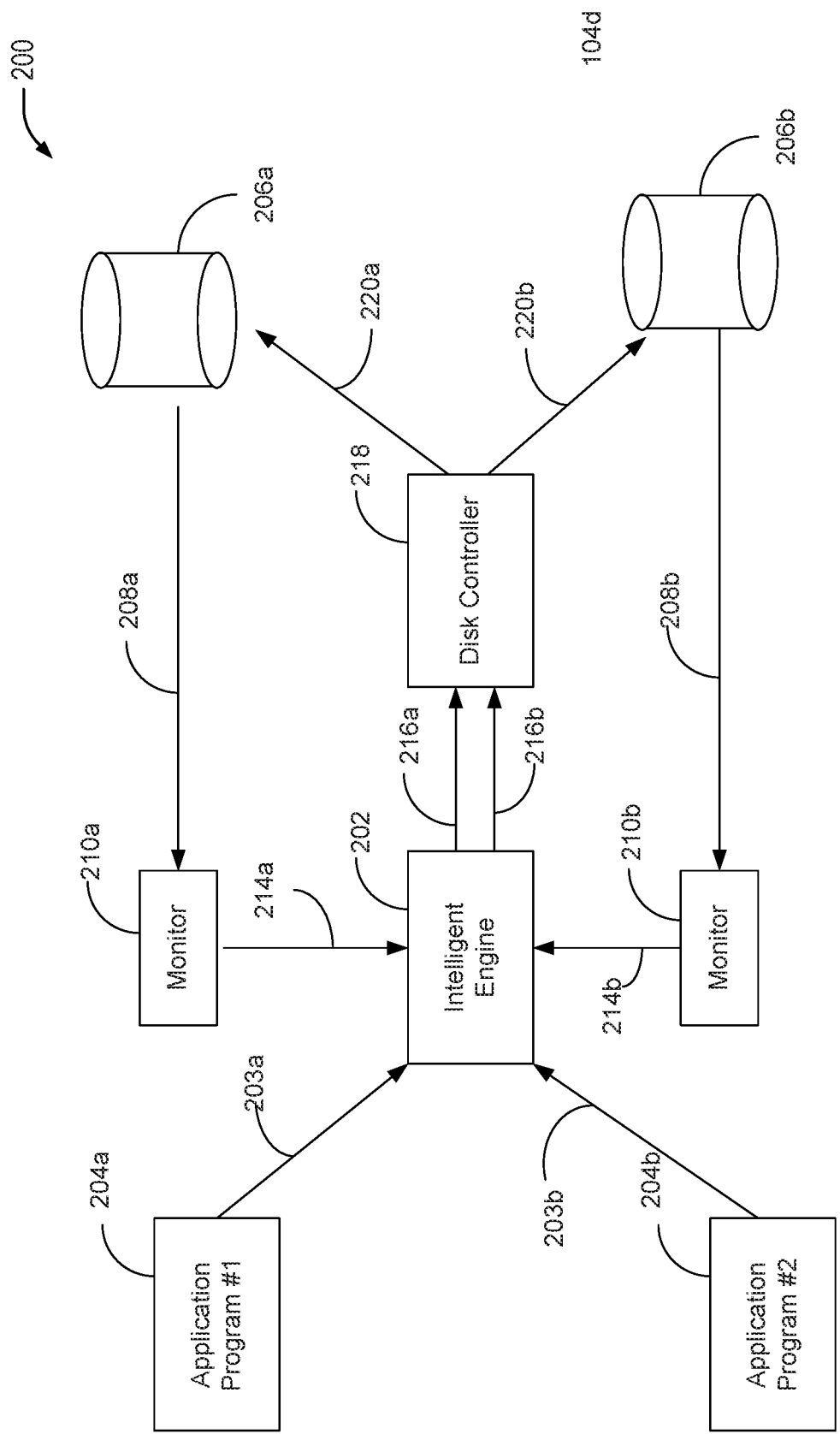
FIG. 2 shows a system that may implement at least some of the disclosed embodiments.

FIG. 2 shows another system 200 that may implement at least some of the disclosed embodiments. The system 200 of FIG. 2 includes an intelligent engine 202. The intelligent engine 202 receives disk write requests 203*a-b* from application programs 204*a-b* respectively. The system 200 also includes at least two stable storage resources 206*a-b*. The stable storage resources 206*a-b* may include one or more stable storage devices. Usage data 208*a-b* of the stable storage resources 206*a-b* respectively may be provided to monitors 210*a-b*. The usage data 208*a-b* may represent utilization of the stable storage resources 206*a-b* respectively. For example, the usage data 208*a-b* may represent input/output (I/O) bus utilization of the stable storage resources 206*a-b* in some aspects. Utilization of the controller 218 may be determined in some aspects. In some other aspects, usage may represent disc arm movement utilization of the stable storage resources 206*a-b*. In some aspects, buffer capacity of a computing resource may be part of a utilization characterization. For example, if a computing resource has no free buffers available, it may be considered 100% utilized in some aspects.

The monitors 210a-b may summarize and/or quantize utilization measurements 208a-b respectively and provide resulting measurements 214a-b to the intelligent engine 202. The intelligent engine 202 may then determine where to allocate the disc write requests 203a-b based on the resulting measurements 214a-b.

The intelligent engine 202 may then send data from the write requests 203a-b as data 216a-b respectively to a disk controller 218 or multiplexer. The intelligent engine 202 may also send control signals 216b to the disk controller 218. The control signals 216b may indicate to the disk controller 218 how to route the data 216a. In other words, the control signals 216b may indicate whether the disk controller 218 should route the data 216 to the stable storage resource 206a via data path 220a or the stable storage resource 206b via data path 220b.

Figure 3:
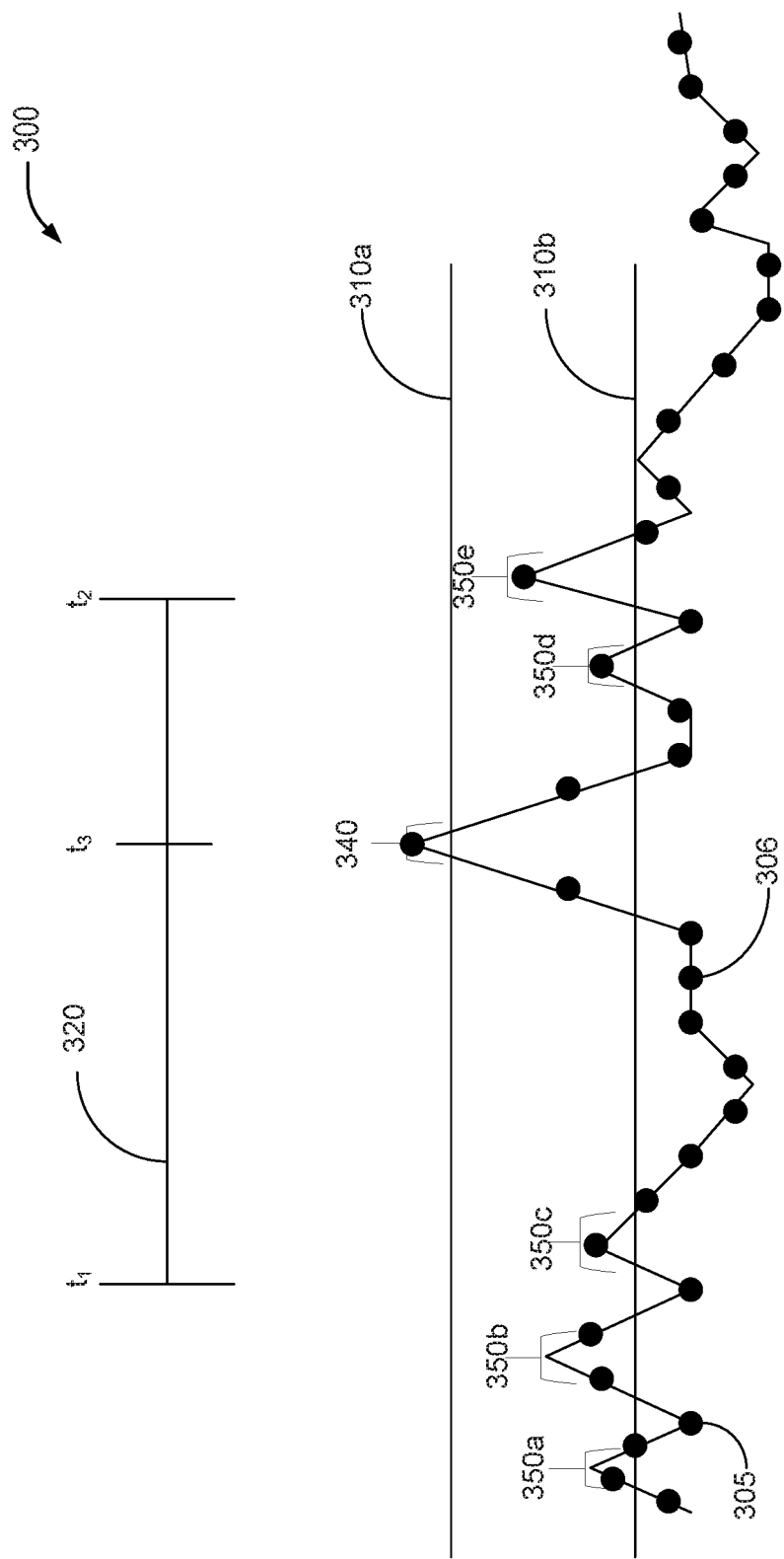
FIG. 3 shows example utilization measurements that may be obtained in one or more of the disclosed embodiments.

FIG. 3 shows example utilization measurements that may be recorded by one or more of the disclosed embodiments. FIG. 3 shows a utilization measurement line 306 over time of a network, such as any of the first through fourth networks 104a-d of FIG. 1. The measurement line 306 is comprised of discrete utilization measurements 305. The utilization measurements 306 may be collected at a periodicity in some aspects. The periodicity of the utilization measurements may vary by embodiment. For example, in some aspects, the periodicity may be any of 0.1 secs, 0.2 secs, 0.3 secs, 0.4 secs, 0.5 secs, 0.6 secs, 0.7 secs, 0.8 secs, 0.9 secs. 1 second, two seconds, or any periodicity. In some aspects, each individual measurement 306 may aggregate one or more finer grained utilization measurements during the measurement period between two individual measurements 306. FIG. 3 also shows a first utilization threshold 310a and a second utilization threshold 310b. The first utilization threshold 310a represents a higher level of utilization than the second utilization threshold 310b. In some aspects, the first utilization threshold 310a and second utilization threshold 310b may be a single threshold having two values represented by the illustrated first and second utilization thresholds 310a-b.

FIG. 3 shows the utilization measurements 305 may fall above, between, or below the two utilization thresholds 310a-b. Some aspects of the disclosure may determine whether a computing resource is available for additional work based on a utilization of the resource and the utilization's relationship to the first and second thresholds 310a-b during a period of time, represented in FIG. 3 as period of time 320, starting at time T1 and ending at time T2. For example, in some aspects, the disclosed aspects may detect when the utilization 306 exceeds the first threshold 310a. This portion of the utilization is shown as utilization 340. The spike occurring at utilization 340 occurs at time T3 within the time window 320. In some aspects, the time window may be defined to include the time of the spike occurring at utilization 340. For example, the time window 320 may begin when the spike at utilization 340 is detected, end when the spike is detected, or be positioned such that the spike is at a mid point of the time window 320.

In response to the utilization exceeding the first threshold 310a, some of the disclosed embodiments may then monitor the utilization 305 during a period of time, represented as period of time 320. These embodiments may count a number of times the utilization exceeds the second threshold 310b. Instances of the utilization 306 exceeding the second threshold 310b during period of time 320 are shown in FIG. 3 as instances 350a-c. In the illustrated embodiment, the utilization 306 exceeds the second threshold 310b three (3) times during the period of time 320, but one of skill would understand that the number could be any number as the utilization 306 fluctuates in response to load on the resource being monitored.

Figure 4:
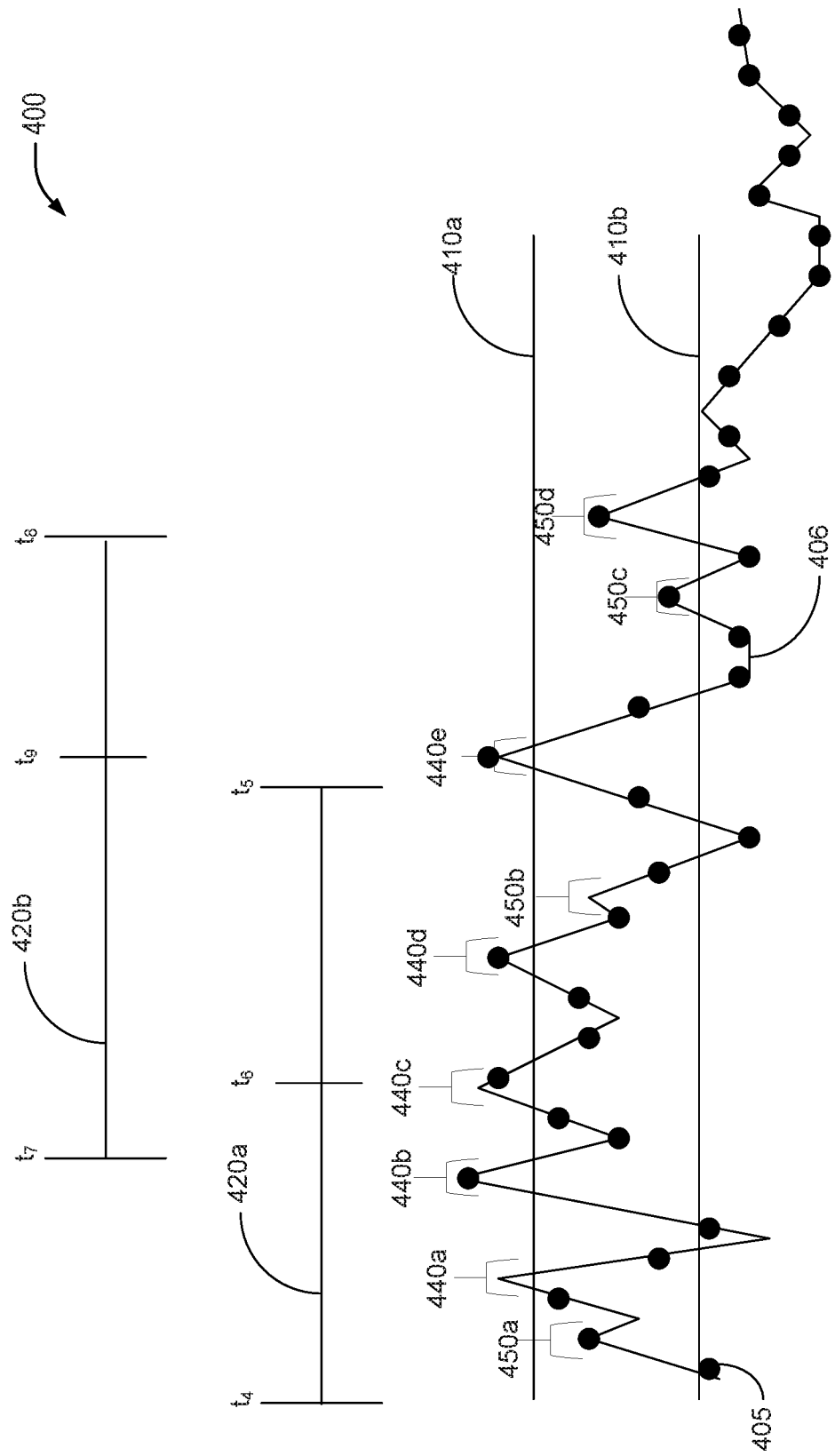
FIG. 4 shows example utilization measurements that may be obtained in one or more of the disclosed embodiments.

FIG. 4 shows example utilization measurements that may be obtained in one or more of the disclosed embodiments. FIG. 4 shows individual utilization measurements 405 defining a utilization graph 406. While the utilization measurements 305 of FIG. 3 defined a single spike above the first threshold 310a, FIG. 4 shows multiple spikes 440a-e above a first utilization threshold 410a. In some aspects, the utilization thresholds 310a and 410a may be equivalent. How the multiple spikes 440a-e above the first utilization threshold 410a are treated may vary by embodiment. For example, in some aspects, a spike such as spike 440c may define a time window 420a, having a start time of t4 and an end time of t5, with the spike 440c occurring at time t6, which is within the time window 420a. In some aspects, other spikes not including the spike 440c may be treated as second spikes that are above a second threshold 410b. For example, in some aspects, each measurement 405 within the time window 420a that is above the second threshold 410b may be treated as a second spike. Thus, FIG. 4 shows thirteen (13) such measurements within the time window 402a. In some other aspects, only the spikes themselves may be counted. In some aspects, a spike may be defined as a first measurement surrounded on each side by contiguous second measurements representing lower utilization than the first measurement. Thus, in these aspects, spikes 440a-b and 440d may be considered second spikes within the time window 420a. Since spike 450a is also within time window 420a, spike 450a may also be considered a second spike in some aspects, as spike 450a is also above the second threshold 410b.

As discussed above, spikes 440a-b and 440d-e, which are above the first threshold 410a, may be treated as spikes that are above the second threshold 410b with respect to a time window defined by one of the other spikes (e.g. 440c). In some of these aspects, each of the spikes 440a-b and 440d-e may also define its own time window. Thus, in some aspects, spikes 440a-e may define five (5) separate time windows. FIG. 4 shows a portion of these other time windows as time window 420b, which may be defined by the spike 440e. For each time window 420a-b of FIG. 4, the disclosed embodiments may track a number of spikes above the second threshold 410b. These spikes may also be above the first threshold 410a, but may not include a spike defining the time window, such as spike 450e for time window 420b, and spike 450c for time window 420a. The disclosed embodiments may determine to dynamically allocate resources based on spikes within any single time window. Thus, for example, time window 420a may include spikes that do not result in any particular dynamic reallocation of computing resources, while time window 420b may include spikes meeting a criterion and therefore in some aspects resulting in a dynamic reallocation of computing resources. The disclosed embodiments may dynamically reallocate resources in that the resources are reallocated according to run-time measurements of the computing resources.

Figure 5:
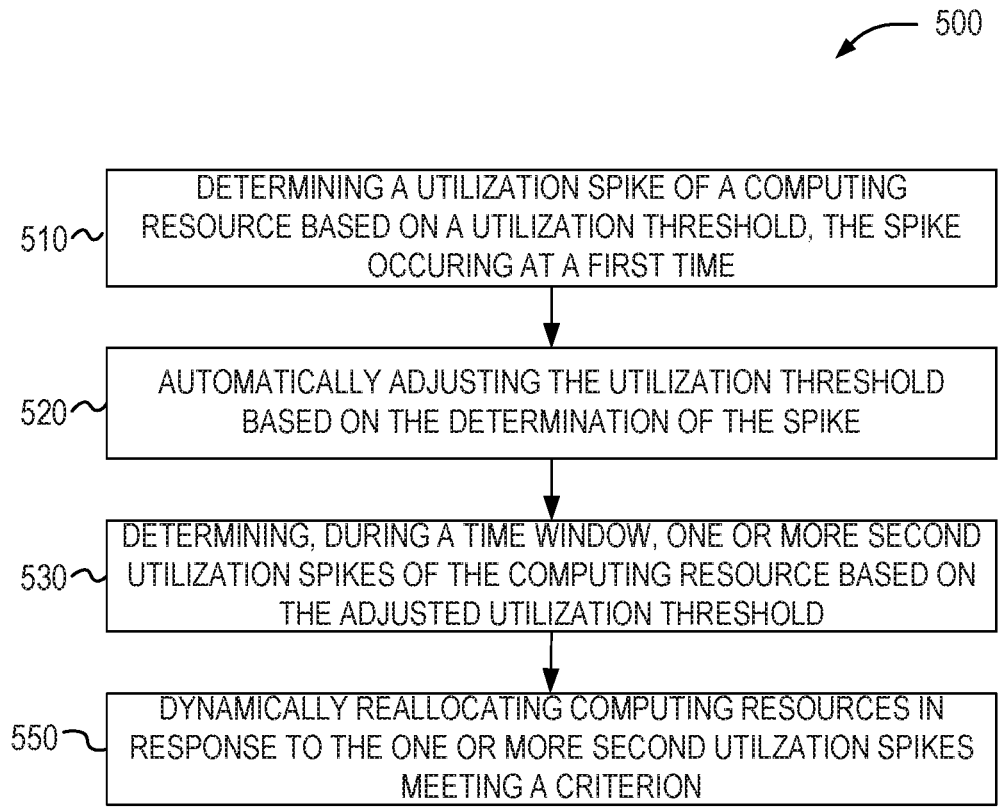
FIG. 5 is a flowchart of a method for dynamically allocating computing resources.

FIG. 5 is a flowchart of a method for dynamically allocating computing resources. In some aspects, process 500, discussed below with respect to FIG. 5, may be performed by the intelligent engine 102 or 202, discussed above with respect to FIGS. 1 and 2 respectively. In some aspects, process 500 may be performed by electronic processing circuitry, such as one or more hardware processors, such as those discussed below with respect to FIG. 6.

In block 510, a spike in utilization of a computing resource is detected or determined. In some aspects, a utilization spike may be detected when a utilization measurement of the computing resource meets a criteria, such as exceeding a threshold value. In some aspects, a utilization spike may be detected when the utilization is determined to exceed the threshold value for a period of time, or when a certain number of contiguous (in time) utilization measurements all exceed the threshold value. An example of the operation of block 510 in some embodiments is provided in FIG. 3 above. For example, FIG. 3 shows the utilization 306 exceeding the threshold 310*a*. This provides for detection of the utilization spike 340.

In block 520, the threshold value is adjusted based on the detection or determination of the spike in utilization of block 510. In some aspects, the threshold value may be decreased in block 520. For example, whereas the threshold referenced in block 510 may represent a first level of utilization, the adjusted threshold may represent a lower level of utilization. An example of block 520 is demonstrated in at least FIG. 3 above. For example, in some aspects of block 520, the threshold may be adjusted from a value represented by threshold 310*a* to a value represented by threshold 310*b*.

In some aspects, the threshold values 310*a* and 310 may be statically determined or defined. In some aspects, the threshold values may be dynamically determined. For example, in some aspects, a moving average utilization of a computing resource may be determined. The first threshold of block 510 may then be based on a percentage value above the moving average. The threshold may then be adjusted to a second percentage above the moving average. In some aspects, the percentage value used to determine the threshold value of block 510 may be a greater percentage of the moving average than the adjusted threshold. In some other aspects, the thresholds may be determined based on a number of standard deviations away from a moving average of the utilization of the computing resource. The moving average in these embodiments may be an average utilization during a previous time period. For example, the time period may be any of the previous 0.1 secs, 0.2 secs, 0.3 secs, 0.4 secs, 0.5 secs, 0.6 secs, 0.7 secs, 0.8 secs, 0.9 secs, 1 secs, 1.5 secs, 2 secs, 2.5 secs, 3 secs, 3.5 secs, 4 secs, 4.5 secs, 5, secs 10 secs or any value in between, greater than, or less than the example time periods provided here.

In block 530, one or more second utilization spikes are detected or determined. The second utilization spikes are detected during a defined time period or window. The time period may be defined to include the spike detected in block 530. In other words, process 500 may examine the utilization during a period of time surrounding the utilization spike of block 510. In some aspects, a time of the spike detected in block 510 may define a start time for the time window. In some other aspects, the time of the spike detected in block 510 may define an end time for the time window. In some other aspects, the time of the spike detected in block 510 may define a mid-point for the time window.

Block 530 may detect second spikes in utilization that exceed the adjusted threshold, or a different threshold value than that used in block 510. The criterion for what constitutes a second "spike" in utilization in block 530 may vary by embodiment. Some embodiments may detect a second spike when any one utilization measurement during the time period exceeds the adjusted or second threshold (e.g. 310*b*). Other embodiments may detect a second spike after a defined number of utilization measurements during the time period exceed the adjusted or second threshold. For example, some embodiments may detect a second spike when two, three, four, five, six, seven, eight, nine, or ten continuous utilization measurements exceed the adjusted or second threshold value. Block 530 may also count or determine a number of second spikes occurring during the time window. In some aspects, block 530 may determine a frequency of second spikes during the time window. For example, in some aspects, block 530 may divide a number of second spikes occurring during the time window by a length of the time window to determine the frequency.

A length of the time window may vary by embodiment. In some aspects, the length of the time window may be based on a speed of a link upon which the utilization is measured. For example, in some aspects, the length of the time window may be proportional to the speed. For example, a link speed of x bits/sec may have a time window length of Y, and a link speed of x+n may have a time window length of Y+m, where X, Y, m, and n are constants. In some other aspects, the ratio of link speed/time window length may be held constant. Thus, as link speed increases, the length of the time window is increased to maintain a constant ratio. In some aspects, the time window may be inversely proportional to the link speed.

In block 550, computing resources are dynamically reallocated in response to the one or more second utilization spikes (detected in block 530) meeting a criterion. For example, as discussed above, the criterion may evaluate whether a number of second spikes detected in block 530 exceeds a defined number. In these aspects, if the number of second spikes exceeds the defined number, load may be shifted away from the computing resource. For example, the load may be allocated to a second computing resource. In some aspects, the computing resource may be an input/output bus, a stable storage device, or a network, such as a telephony network. In some aspects, the computing resource may be a core within a multi-core hardware processor. In these aspects, decisions as to how to route processing tasks to which core of the multi-core hardware processor may be based on the techniques of the present disclosure.

As discussed above with respect to FIG. 1, dynamically allocating resources may include routing traffic over a first network (e.g. 104*c*) instead of a second network (e.g. 104*d*). For example, load may be routed over a network with a lower or more stable utilization and/or jitter instead of a network having higher utilization and/or jitter. In some aspects, established call traffic may be rerouted based on the analysis of utilization of a network. For example, in some aspects, process 500 may include determining, based on the second utilization spikes detected in block 530, an amount of time that the utilization of a first network exceeded the adjusted or second threshold (e.g. 310*b* or 410*b*), and rerouting established call traffic from the first network to the second network based in the utilization exceeding the second threshold for a defined percentage of the time within the window.

With respect to FIG. 2, dynamically allocating resources may include routing stable storage write requests (e.g. 203*a* or 203*b*) or file operations to a first stable storage device (e.g. 206*a*) or a second stable storage device (e.g. 206*b*). For example, disk write requests or other file based operations may be routed to a stable storage device that is less heavily utilized than another stable storage device, reducing latency of write requests and/or file operations and load balancing the stable storage devices in some aspects.

In some aspects, dynamically allocating resources may include initiating diagnostics on a network having the determined utilization characteristics in response to the utilization measurements meeting a first criteria. For example, in some aspects, in response to the utilization measurements meeting the first criteria, diagnostic modes in one or more of the network elements 106a-f may be modified by the intelligent engine 102 and/or the monitors 108a and/or 108b. For example, when the utilization meets the first criteria, a verbosity of the diagnostics may be increased so as to provide a greater level of detail on operation of one or more of the network elements 106a-f. Data indicating the greater level of detail may then be parsed to determine a cause of the utilization in some aspects.

In some aspects, the second utilization spikes may meet the criterion when a frequency of the second utilization spikes during the time window exceeds a defined frequency threshold. As discussed above, the frequency threshold and/or number of second spikes threshold may be dynamically adjusted based on a speed of a link or a capacity of the computing resource. In some aspects, block 550 may evaluate the second utilization spikes according to multiple criterion, such as both a number of spikes relative to a number of spikes threshold and also a frequency of the spikes relative to a frequency threshold.

In some aspects, after the time window is complete or has passed, the adjusted threshold may be restored to its previous value, such as the value in block 510. In some aspects, two threshold values may be used (one in block 510 and a different threshold in block 530, so there may be no need to restore the threshold value. For example, in these aspects, block 520 may not be performed, as use of two different threshold does not need an automatic threshold adjustment. Instead, the operation of block 520 may be achieved by applying the second threshold in block 530 instead of the threshold used in block 510.

Figure 6:
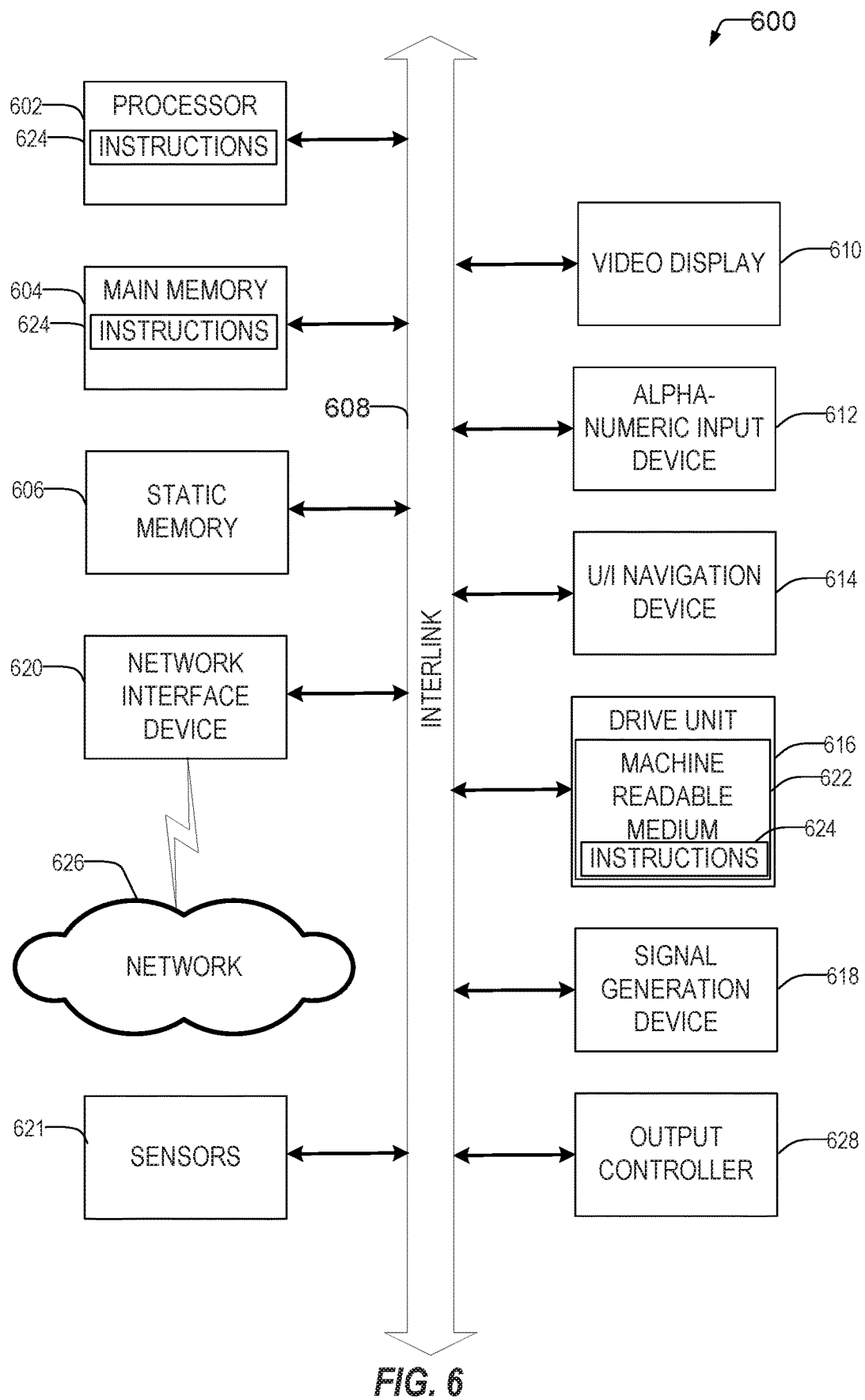
FIG. 6 illustrates a block diagram of an example machine which may perform any one or more of the techniques (e.g., methodologies) discussed herein.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. Machine 600 may implement, in whole or in part, any one or more of the intelligent engine 102, intelligent engine 202, multiplexer 110, disk controller 218. In various embodiments, machine 600 may perform one or more of the processes described above with respect to FIG. 5. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a system comprising processing circuitry; an electronic hardware memory storing instructions that, when executed by the processing circuitry, control the system to perform operations comprising: determining, at a first time, that a utilization measurement of a computing resource exceeds a utilization threshold; automatically adjusting the utilization threshold based on the determination; determining, during a time window, one or more second utilization measurements of the computing resource that exceed the adjusted utilization threshold; and dynamically reallocating resources in response to the determined one or more second utilization measurements meeting a first criterion.

In Example 2, the subject matter of Example 1 optionally includes wherein dynamically reallocating resources comprises directing file operations to a first stable storage device in response to the determined one or more second utilization measurements meeting the first criterion and directing the file operations to a second stable storage otherwise.

In Example 3, the subject matter of any one or more of Examples 1-2 optionally include the operations further comprising determining the first criterion is met if a number of the second utilization measurements is above a predetermined number within the time window.

In Example 4, the subject matter of Example 3 optionally includes the operations further comprising determining the first criterion is met if a frequency of second utilization measurements within the time window is above a predetermined frequency threshold.

In Example 5, the subject matter of any one or more of Examples 1-4 optionally include wherein the adjusting of the utilization threshold lowers a network utilization represented by the utilization threshold.

In Example 6, the subject matter of any one or more of Examples 1-5 optionally include the operations further comprising restoring the utilization threshold after the time window.

In Example 7, the subject matter of any one or more of Examples 1-6 optionally include determining the time window to include the first time.

In Example 8, the subject matter of Example 7 optionally includes the operations further comprising determining the time window such that the first time is a mid-point of the time window.

In Example 9, the subject matter of any one or more of Examples 1-8 optionally include wherein dynamically reallocating resources comprises routing network data over a first network in response to the determined one or more second utilization measurements meeting the first criterion and routing the network data over a second network otherwise.

In Example 10, the subject matter of Example 9 optionally includes wherein the first network is an Internet Protocol (IP) network and the second network is a Time Division Multiplexing network or a wireless network.

In Example 11, the subject matter of any one or more of Examples 9-10 optionally include wherein dynamically reallocating resources by routing network data comprises communicating to a multiplexer the network data and an indication of whether to route the network data over the first network or the second network.

In Example 12, the subject matter of any one or more of Examples 9-11 optionally include the operations further comprising initiating diagnostics on the first network in response to the determined utilization measurements meeting the first criterion.

In Example 13, the subject matter of any one or more of Examples 9-12 optionally include the operations further comprising determining the second utilization measurements meet the first criterion when the second utilization measurements indicate that the first network's utilization exceeded the adjusted utilization threshold for a predetermined period of time.

In Example 14, the subject matter of any one or more of Examples 9-13 optionally include the operations further comprising rerouting established call traffic from the first network to the second network in response to the one or more second utilization measurements meeting the first criterion.

In Example 15, the subject matter of Example 14 optionally includes the operations further comprising determining, based on the second utilization measurements, an amount of time that the utilization of the first network exceeded the adjusted threshold within the time window, and rerouting established call traffic from the first network to the second network based on the utilization exceeding the second threshold for a predetermined percentage of the time within the time window.

Example 16 is a method for dynamically allocating computing resources, comprising determining, at a first time, via processing circuitry, a utilization measurement of a computing resource exceeds a utilization threshold; automatically adjusting the utilization threshold based on the determination; determining, during a time window, one or more second utilization measurements of the computing resource that exceed the adjusted utilization threshold; and dynamically reallocating resources in response to the determined one or more second utilization measurements meeting a first criterion.

In Example 17, the subject matter of Example 16 optionally includes determining the first criterion is met if a number of the second utilization measurements is above a predetermined number within the time window.

In Example 18, the subject matter of any one or more of Examples 16-17 optionally include wherein the adjusting of the utilization threshold lowers a network utilization represented by the utilization threshold.

In Example 19, the subject matter of any one or more of Examples 17-18 optionally include determining the first criterion is met if a frequency of the second utilization measurements within the time window is above a predetermined frequency threshold.

In Example 20, the subject matter of any one or more of Examples 16-19 optionally include restoring the utilization threshold after the time window.

In Example 21, the subject matter of any one or more of Examples 16-20 optionally include determining the time window to include the first time.

In Example 22, the subject matter of Example 21 optionally includes determining the time window such that the first time is a mid-point of the time window.

In Example 23, the subject matter of any one or more of Examples 16-22 optionally include wherein dynamically reallocating resources comprises routing network data over a first network in response to the determined one or more second utilization measurements meeting the first criterion and routing the network data over a second network otherwise.

In Example 24, the subject matter of Example 23 optionally includes rerouting established call traffic from the first network to the second network in response to the one or more second utilization measurements meeting the first criterion.

In Example 25, the subject matter of Example 24 optionally includes determining, based on the second utilization measurements, an amount of time that the utilization of the first network exceeded the adjusted threshold within the time window, and rerouting established call traffic from the first network to the second network based on the utilization exceeding the second threshold for a predetermined percentage of the time within the time window.

In Example 26, the subject matter of any one or more of Examples 23-25 optionally include wherein the first network is an Internet Protocol (IP) network and the second network is a Time Division Multiplexing network or a wireless network.

In Example 27, the subject matter of any one or more of Examples 23-26 optionally include wherein dynamically reallocating resources by routing network data comprises communicating to a multiplexer the network data and an indication of whether to route the network data over the first network or the second network.

In Example 28, the subject matter of any one or more of Examples 23-27 optionally include initiating diagnostics on the first network in response to the determined utilization measurements meeting the first criterion.

In Example 29, the subject matter of any one or more of Examples 23-28 optionally include the second utilization measurements meet the first criterion when the second utilization measurements indicate that the first network's utilization exceeded the adjusted utilization threshold for a predetermined period of time.

In Example 30, the subject matter of any one or more of Examples 16-29 optionally include wherein dynamically reallocating resources comprises directing file operations to a first stable storage device in response to the determined one or more second utilization measurements meeting the first criterion and directing the file operations to a second stable storage otherwise.

Example 31 is a non-transitory computer readable storage medium comprising instructions that when executed cause processing circuitry to perform operations to dynamically allocate computing resources, the operations comprising determining, at a first time, via processing circuitry, a utilization measurement of a computing resource exceeds a utilization threshold; automatically adjusting the utilization threshold based on the determination; determining, during a time window, one or more second utilization measurements of the computing resource that exceed the adjusted utilization threshold; and dynamically reallocating resources in response to the determined one or more second utilization measurements meeting a first criterion.

In Example 32, the subject matter of Example 31 optionally includes wherein dynamically reallocating resources comprises routing network data over a first network in response to the determined one or more second utilization measurements meeting the first criterion and routing the network data over a second network otherwise.

In Example 33, the subject matter of any one or more of Examples 31-32 optionally include wherein dynamically reallocating resources comprises directing file operations to a first stable storage device in response to the determined one or more second utilization measurements meeting the first criterion and directing the file operations to a second stable storage otherwise.

In Example 34, the subject matter of any one or more of Examples 31-33 optionally include the operations further comprising determining the first criterion is met if a predetermined number of the second utilization measurements is above a predetermined number within the time window.

In Example 35, the subject matter of Example 34 optionally includes the operations further comprising determining the first criterion is met if a frequency of second utilization measurements within the time window is above a predetermined frequency threshold.

In Example 36, the subject matter of any one or more of Examples 31-35 optionally include the operations further comprising restoring the utilization threshold after the time window.

In Example 37, the subject matter of any one or more of Examples 31-36 optionally include determining the time window to include the first time.

In Example 38, the subject matter of Example 37 optionally includes the operations further comprising determining the time window such that the first time is a mid-point of the time window.

In Example 39, the subject matter of any one or more of Examples 32-38 optionally include the operations further comprising determining the second utilization measurements meet the first criterion when the second utilization measurements indicate the first network's utilization exceeds the adjusted utilization threshold for a predetermined period of time.

In Example 40, the subject matter of any one or more of Examples 32-39 optionally include wherein the adjusting of the utilization threshold lowers a network utilization represented by the utilization threshold.

In Example 41, the subject matter of any one or more of Examples 32-40 optionally include the operations further comprising rerouting established call traffic from the first network to the second network in response to the one or more second utilization measurements meeting the first criterion.

In Example 42, the subject matter of Example 41 optionally includes the operations further comprising determining, based on the second utilization measurements, an amount of time that the utilization of the first network exceeded the adjusted threshold within the time window, and rerouting established call traffic from the first network to the second network based on the utilization exceeding the second threshold for a predetermined percentage of the time within the time window.

In Example 43, the subject matter of any one or more of Examples 32-42 optionally include wherein the first network is an Internet Protocol (IP) network and the second network is a Time Division Multiplexing network or a wireless network.

In Example 44, the subject matter of any one or more of Examples 32-43 optionally include wherein dynamically reallocating resources by routing network data comprises communicating to a multiplexer the network data and an indication of whether to route the network data over the first network or the second network.

In Example 45, the subject matter of any one or more of Examples 32-44 optionally include the operations further comprising initiating diagnostics on the first network in response to the determined utilization measurements meeting the first criterion.

Example 46 is an apparatus for dynamic reallocation of computing resources, the apparatus comprising means for determining, at a first time, via processing circuitry, a utilization measurement of a computing resource exceeds a utilization threshold; means for automatically adjusting the utilization threshold based on the determination; means for determining, during a time window, one or more second utilization measurements of the computing resource that exceed the adjusted utilization threshold; and means for dynamically reallocating resources in response to the determined one or more second utilization measurements meeting a first criterion.

In Example 47, the subject matter of Example 46 optionally includes means for restoring the utilization threshold after the time window.

In Example 48, the subject matter of any one or more of Examples 46-47 optionally include means for determining the first criterion is met if a predetermined number of the second utilization measurements is above a predetermined number within the time window.

In Example 49, the subject matter of any one or more of Examples 46-48 optionally include means for determining the time window to include the first time.

In Example 50, the subject matter of Example 49 optionally includes means for determining the time window such that the first time is a mid-point of the time window.

In Example 51, the subject matter of any one or more of Examples 46-50 optionally include wherein the means for dynamically reallocating resources comprises means for routing network data over a first network in response to the determined one or more second utilization measurements meeting the first criterion and routing the network data over a second network otherwise.

In Example 52, the subject matter of Example 51 optionally includes means for determining the first criterion is met if a frequency of second utilization measurements within the time window is above a predetermined frequency threshold.

In Example 53, the subject matter of any one or more of Examples 51-52 optionally include means for determining the first criterion is met in response to the second utilization measurements indicating that the first network's utilization exceeded the adjusted utilization threshold for a predetermined period of time.

In Example 54, the subject matter of any one or more of Examples 51-53 optionally include wherein the adjusting of the utilization threshold lowers a network utilization represented by the utilization threshold.

In Example 55, the subject matter of any one or more of Examples 51-54 optionally include means for rerouting established call traffic from the first network to the second network in response to the one or more second utilization measurements meeting the first criterion.

In Example 56, the subject matter of Example 55 optionally includes means for determining, based on the second utilization measurements, an amount of time that the utilization of the first network exceeded the adjusted threshold within the time window, and means for rerouting established call traffic from the first network to the second network based on the utilization exceeding the adjusted threshold for a predetermined percentage of the time within the time window.

In Example 57, the subject matter of any one or more of Examples 51-56 optionally include wherein the first network is an Internet Protocol (IP) network and the second network is a Time Division Multiplexing network or a wireless network.

In Example 58, the subject matter of any one or more of Examples 51-57 optionally include wherein dynamically reallocating resources by routing network data comprises communicating to a multiplexer the network data and an indication of whether to route the network data over the first network or the second network.

In Example 59, the subject matter of any one or more of Examples 51-58 optionally include means for initiating diagnostics on the first network in response to the determined utilization measurements meeting the first criterion.

In Example 60, the subject matter of any one or more of Examples 46-59 optionally include wherein the means for dynamically reallocating resources comprises means for directing file operations to a first stable storage device in response to the determined one or more second utilization measurements meeting the first criterion and means for directing the file operations to a second stable storage otherwise.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. A system comprising processing circuitry;
an electronic hardware memory storing instructions that, when executed by the processing circuitry, control the system to perform operations comprising:
  determining, at a first time, that a utilization measurement of a computing resource exceeds a utilization threshold;
  automatically adjusting the utilization threshold based on the determination;
  determining, during a time window, one or more second utilization measurements of the computing resource that exceed the adjusted utilization threshold; and
  dynamically reallocating resources in response to the determined one or more second utilization measurements meeting a first criterion.

2. The system of claim 1, wherein dynamically reallocating resources comprises directing file operations to a first stable storage device in response to the determined one or more second utilization measurements meeting the first criterion and directing the file operations to a second stable storage otherwise.

3. The system of claim 1, the operations further comprising determining the first criterion is met if a number of the second utilization measurements is above a predetermined number within the time window.

4. The system of claim 3, the operations further comprising determining the first criterion is met if a frequency of second utilization measurements within the time window is above a predetermined frequency threshold.

5. The system of claim 1, the operations further comprising determining the time window such that the first time is a mid-point of the time window.

6. The system of claim 1, wherein dynamically reallocating resources comprises routing network data over a first network in response to the determined one or more second utilization measurements meeting the first criterion and routing the network data over a second network otherwise.

7. The system of claim 6, wherein dynamically reallocating resources by routing network data comprises communicating to a multiplexer the network data and an indication of whether to route the network data over the first network or the second network.

8. The system of claim 6, the operations further comprising determining the second utilization measurements meet the first criterion when the second utilization measurements indicate that the first network's utilization exceeded the adjusted utilization threshold for a predetermined period of time.

9. The system of claim 6, the operations further comprising determining, based on the second utilization measurements, an amount of time that the utilization of the first network exceeded the adjusted threshold within the time window, and rerouting established call traffic from the first network to the second network based on the utilization exceeding the second threshold for a predetermined percentage of the time within the time window.

10. A method for dynamically allocating computing resources, comprising
  determining, at a first time, via processing circuitry, a utilization measurement of a computing resource exceeds a utilization threshold;
  automatically adjusting the utilization threshold based on the determination;
  determining, during a time window, one or more second utilization measurements of the computing resource that exceed the adjusted utilization threshold; and
  dynamically reallocating resources in response to the determined one or more second utilization measurements meeting a first criterion.

11. The method of claim 10, further comprising determining the first criterion is met if a number of the second utilization measurements is above a predetermined number within the time window.

12. The method of claim 11, further comprising determining the first criterion is met if a frequency of the second utilization measurements within the time window is above a predetermined frequency threshold.

13. The method of claim 10, wherein dynamically reallocating resources comprises routing network data over a first network in response to the determined one or more second utilization measurements meeting the first criterion and routing the network data over a second network otherwise.

14. The method of claim 13, further comprising rerouting established call traffic from the first network to the second network in response to the one or more second utilization measurements meeting the first criterion.

15. The method of claim 14, further comprising determining, based on the second utilization measurements, an amount of time that the utilization of the first network exceeded the adjusted threshold within the time window, and rerouting established call traffic from the first network to the second network based on the utilization exceeding the second threshold for a predetermined percentage of the time within the time window.

16. The method of claim 10, wherein dynamically reallocating resources comprises directing file operations to a first stable storage device in response to the determined one or more second utilization measurements meeting the first criterion and directing the file operations to a second stable storage otherwise.

17. An apparatus for dynamic reallocation of computing resources, the apparatus comprising
    means for determining, at a first time, via processing circuitry, a utilization measurement of a computing resource exceeds a utilization threshold;
    means for automatically adjusting the utilization threshold based on the determination;
    means for determining, during a time window, one or more second utilization measurements of the computing resource that exceed the adjusted utilization threshold; and
    means for dynamically reallocating resources in response to the determined one or more second utilization measurements meeting a first criterion.

18. The apparatus of claim 17, further comprising means for determining the first criterion is met if a predetermined number of the second utilization measurements is above a predetermined number within the time window.

19. The apparatus of claim 17, wherein the means for dynamically reallocating resources comprises means for routing network data over a first network in response to the determined one or more second utilization measurements meeting the first criterion and routing the network data over a second network otherwise.

20. The apparatus of claim 19, further comprising means for determining the first criterion is met in response to the second utilization measurements indicating that the first network's utilization exceeded the adjusted utilization threshold for a predetermined period of time.

* * * * *